(12) United States Patent
Kulkaski

(10) Patent No.: US 6,880,209 B2
(45) Date of Patent: Apr. 19, 2005

(54) WALK AROUND GRASS CUTTER PARTS

(76) Inventor: Stanley V. Kulkaski, 24 Stony Brook Dr., Warren, NJ (US) 07059

( * ) Notice: Subject to any disclaimer, the term of this patent is extended or adjusted under 35 U.S.C. 154(b) by 102 days.

(21) Appl. No.: 10/609,700

(22) Filed: Jun. 30, 2003

(65) Prior Publication Data

US 2004/0000040 A1 Jan. 1, 2004

Related U.S. Application Data

(63) Continuation-in-part of application No. 10/292,048, filed on Nov. 12, 2002, now Pat. No. 6,637,081.
(60) Provisional application No. 60/390,807, filed on Jun. 20, 2002, and provisional application No. 60/439,741, filed on Jan. 13, 2003.

(51) Int. Cl.[7] ............................ A44B 21/00; B60J 10/08
(52) U.S. Cl. ........................ 24/462; 56/202; 56/320.1; 56/320.2
(58) Field of Search .................... 24/462, 289, 297; 296/146.1, 146.9; 428/99, 100, 122; 52/716.1–717.06, 718.01–718.07; 49/475.1–500.1; 56/202, 320.1, 320.2

(56) References Cited

U.S. PATENT DOCUMENTS

| | | | | |
|---|---|---|---|---|
| 4,103,459 A | * | 8/1978 | Barnerias et al. | 49/490.1 |
| 4,495,234 A | * | 1/1985 | Tominaga et al. | 428/122 |
| 4,538,380 A | * | 9/1985 | Colliander | 49/475.1 |
| 4,787,668 A | * | 11/1988 | Kawase et al. | 49/490.1 |
| 4,976,068 A | * | 12/1990 | Keys | 49/482.1 |
| 5,099,612 A | * | 3/1992 | Hayashi et al. | 49/479.1 |
| 5,326,592 A | * | 7/1994 | Goewey et al. | 427/256 |
| 5,390,974 A | * | 2/1995 | Theodorakakos | 296/146.9 |
| 5,449,544 A | * | 9/1995 | Ogawa et al. | 428/122 |
| 6,085,509 A | * | 7/2000 | Plamper et al. | 56/202 |
| 6,458,301 B1 | * | 10/2002 | Hendrix | 264/141 |
| 6,520,563 B1 | * | 2/2003 | Nozaki | 296/146.9 |
| 6,589,664 B1 | * | 7/2003 | Kobayashi et al. | 428/122 |
| 6,617,015 B1 | * | 9/2003 | Rood | 428/122 |

FOREIGN PATENT DOCUMENTS

| | | | | |
|---|---|---|---|---|
| EP | 0613800a1 | * | 9/1994 | B60J/10/08 |
| EP | 0622261 A1 | * | 11/1994 | B60J/10/08 |
| GB | 2183707 A | * | 6/1987 | E06B/7/23 |
| GB | 2193242 | * | 2/1988 | E06B/7/23 |
| GB | 2209788 A | * | 5/1989 | E06B/7/22 |
| JP | 405254350 A | * | 10/1993 | B60R/13/04 |
| JP | 406135287 A | * | 5/1994 | B60J/10/08 |

* cited by examiner

*Primary Examiner*—Robert J. Sandy
(74) *Attorney, Agent, or Firm*—Robert M. Skolnik

(57) ABSTRACT

A self propelled lawnmower protective component used to support the grass catcher door is formed of a plastic material that is more flexible than the polyethylene material used in the prior art. By using co-extrusion, two different plastics are extruded into one shape. When applied to the lawnmower structure, the adhesion between the basic profile and a co-extruded ball or flap is extremely tight. Metallocene olefin is the plastic material which, when compressed under load and heat, recovers its original shape, similar to a soft rubber product and still has the capability of adhering to the polyethylene profile, so as not to separate after continuous or repeated use.

4 Claims, 2 Drawing Sheets

WALK AROUND GRASS CUTTER PARTS

CROSS REFERENCE TO RELATED APPLICATIONS

This application is a continuation in part of my application Ser. No. 10/292,048, filed Nov. 12, 2002 now U.S. Pat. No. 6,637,081, and claims the priority of my Provisional Application Ser. No. 60/390,807, filed Jun. 20, 2002; and Provisional Application Ser. No. 60/439,741, filed Jan. 13, 2003.

BACKGROUND OF THE INVENTION

1. Field of the Invention

The present invention is an improved construction of plastic parts used in manually propelled lawnmowers.

2. Description of the Related Art

As disclosed in the aforementioned co-pending applications, every effort is made to protect the operator of a manual pushed walk around grass cutter by constantly scrutinizing the device for opportunities to improve on the safety factor.

Those applications focused on an area in need of improvement involving grass cutters that can be used with or without grass bag attachments. Those grass cutters usually have a spring-loaded door permanently attached as part of the cutter body itself. When the cutter is used without a grass bag attached, the door is spring loaded closed, however, when a grass bag is used, its installation process requires that the spring-loaded door be hand held open. The entire bag and assembly is attached to the mower and the spring-loaded door is released. The door then rests on the surface of the plastic trim that surrounds the entire opening of the grass bag itself. The problem is that air escaping between the plastic trim on the bag, and the door surface (referred as blow back) is sufficient enough to cause concern for the operator's safety.

The solutions disclosed in the my aforementioned co-pending applications involve the use of certain materials and making certain structural changes in profile so as to reconfigure the plastic trim that contacts the door surface, including the introduction of a small hollow ball as part of the plastic profile or use of a flap to seal the door. The plastic material used in the co-pending applications solved the problems caused by the pressure from the spring-loaded door compressing part of the ball or the flap as the case may be producing a good intimate contact between the spring-loaded door and the material of choice. As is known in the art, after hours of use, as the grass cutter tends to heat up, the hollow ball on the one hand or the flap on the other hand assumes a permanent set, so that when the grass bag is removed, the ball or the flap becomes permanently distorted from the pressure from the spring loaded door and the elevated temperature.

The second plastic material for the hollow ball or the flap has many obstacles to overcome:

1. The adhesion between the two materials has to be intense enough to prevent separation between the two materials.
2. The hollow ball or the flap should be flexible enough to compress on contact with the door.

The plastic material manufactured by Advanced Elastomer Systems, Akron, Ohio solved all of the above named problems. These products are commonly referred to as TPE (Thermoplastic Elastomer) one of which is sold under the trademark SANTOPRENE.

SUMMARY OF THE INVENTION

The present invention forms the flap or ball from a second plastic material that is more flexible than the polyethylene material used in the prior art and is less expensive than the TPE used in the co-pending applications. The process for forming the device is commonly referred to as co-extrusion. Two different plastics are extruded into one shape. When applied to the lawnmower structures, the adhesion between the basic profile and the co-extruded flap or ball must be extremely tight since any breakage or separation of the flap or ball from the remainder of the structure will create a severe safety problem.

I have found a plastic material which, when compressed under load and heat, recovers its original shape, similar to a soft rubber product and still has the capability of adhering to the basic polyethylene profile, so as not to separate after continuous or repeated use and still return to its original shape.

Polymerization of olefin monomers with single-site metallocene catalysts allows the production of polyolefins (such as polyethylene or polypropylene) with a highly defined structure and superior properties. Furthermore, the structure of these metallocene catalysts can be varied to 'tune' the properties of the polymer. Thus, for the first time it is possible to tailor carefully the properties of large-volume commodity polymers.

These plastic materials, known as metallocene olefins, are manufactured by a number of suppliers solved all of the above named problems. Through the co-extrusion process, I have extruded a flap and ball of one material (metallocene olefin) onto a supporting clip of a second material (low density polyethylene). The final products have been tested and have solved the blow back problem.

The foregoing, as well as further objects and advantages of the invention will become apparent to those skilled in the art from a review of the following detailed description of my invention, reference being made to the accompanying drawings.

DETAILED DESCRIPTION OF THE PREFERRED EMBODIMENT

Metallocene refers to the type of catalyst used to produce the polymer, i.e. metallocene catalyst. Metallocene and other single site catalysts are used for polyolefins. Metallocene catalysts are metallorganic compounds that can work as activators for the reaction that produces the polymer. A metallocene type catalyst gives a polymer with a narrower molecular weight distribution and a more even comonomer distribution. This results in a polymer with an improved profile.

Figure 1:
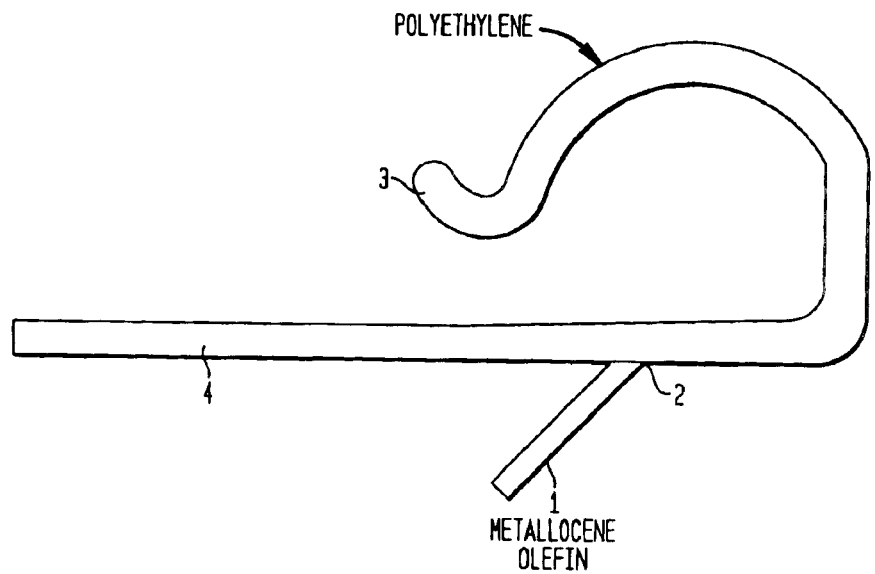
FIG. 1 is a side view, partially in section, of the flap type lawnmower component fabricated in accordance with my invention.

FIG. 1 shows the flap type lawnmower component of the prior art modified in accordance with this invention. A flap 1 is attached to a spring clip formed between spring hook 3 and elongated member 4. The flap is joined to the spring clip at portion 2. The spring clip is formed of low-density polyethylene. The flap 1 is formed of metallocene olefin. The flap 1 is formed onto the spring clip at portion 2 by co-extrusion.

Figure 2:
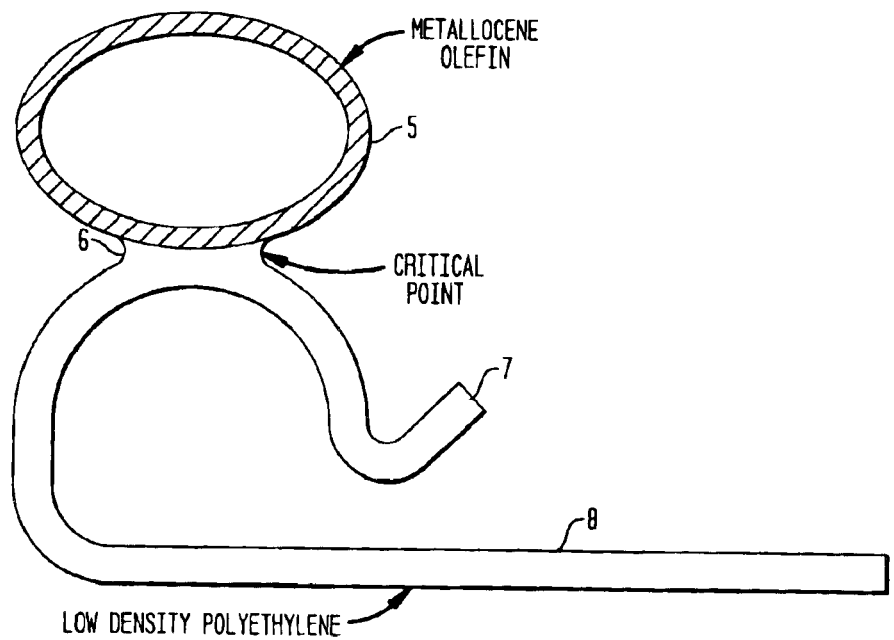
FIG. 2 is a side view, partially in section, of the ball type lawnmower component fabricated in accordance with my invention.

FIG. 2 is a side view of a ball type lawnmower component of the prior art fabricated in accordance with my invention. A hollow ball 5 is formed of metallocene olefin. The ball 5 is formed onto the spring clip (formed by hook 7 and elongated member 8), at portion 6 by co-extrusion. The spring clip portions elements 6, 7 and 8 are formed of low-density polyethylene.

Figure 3:
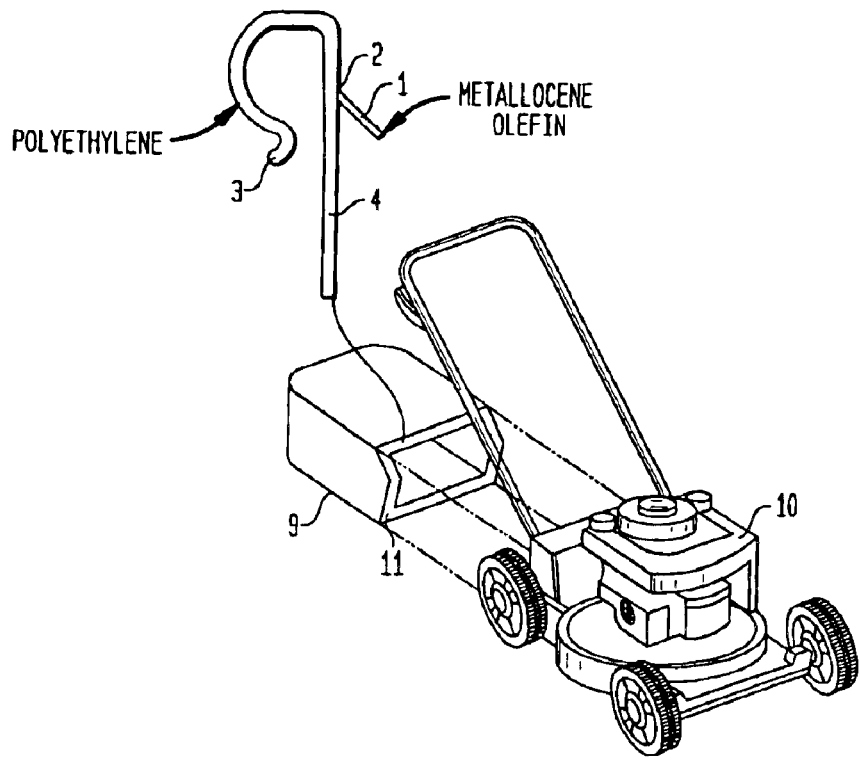
FIG. 3 is an exploded perspective view showing the component of FIG. 1 in use on a lawnmower.

As shown in FIG. 3, a rear discharge lawnmower 10 has a grass catcher bag 9 attached thereto. One or more of the components of FIGS. 1 or is supported either vertically or horizontally in seams 11 formed on the front of the bag 9. The elongated portion 4 of the component is mounted in the seams 11 such that the flap 1 or ball 5 can hold open the lawnmower's spring loaded rear trap door (not shown).

Figure 4:
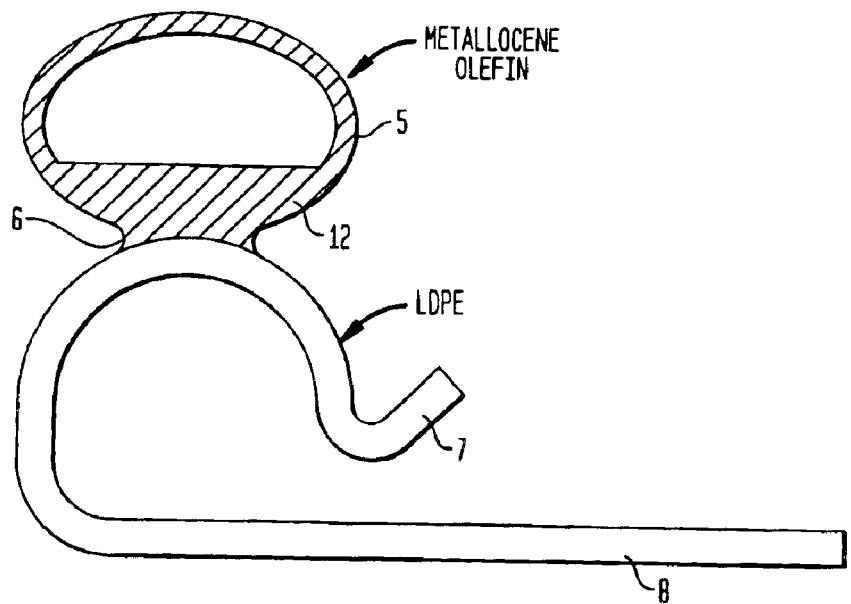
FIG. 4 is a view of an alternate embodiment of the ball type component shown in FIG. 2.

FIG. 4 shows another embodiment of my invention. In this embodiment, an additional volume of metallocene olefin is deposited in area 12 of the ball 5 adjacent portion 6 of the clip 8. This additional volume of material is required to provide additional strength to absorb the forces imposed on the device because of the way the assembly is attached to the lawnmower. The area 12 may contain a volume of material sufficient to occupy approximately 20%–40% of the cross-sectional area of the ball 5 to provide the required strength. The ball 5 is co-extruded onto the portion 6 of the clip 8. The additional volume of material 12 is formed by co-extrusion.

The following example shows the process by which the invention was made. Co-extrusion of different plastic materials is described in the prior art, namely, my U.S. Pat. No. 5,862,591, issued Jan. 26, 1999 the disclosure of which is hereby incorporated by reference herein. Using the co-extrusion methods and apparatus disclosed in my patent, the structure of FIG. 1 was fabricated using metallocene olefin and LPDE (low-density polyethylene). The temperatures of these materials were 325° and 350°, respectively were co-extruded using the following apparatus: extruder, model 2½"–24/1 single screw, manufactured by NRM Corporation, Akron, Ohio; extruder model 1½, manufactured by Prodex; and a co-extrusion die, designed by K. Jabat Inc. and manufactured by Meridian Precision.

Further modifications to the methods and apparatus of the invention may be made without departing from the spirit and scope of the invention.

What is claimed is:

1. A spring clip for a rear discharge door of a lawnmower comprising: a spring clip formed of a low density polyethylene, said spring clip having an elongated portion and a hook portion and a hollow ball formed of metallocene olefin attached to said hook portion.

2. A spring clip for a rear discharge door of a lawnmower formed by co-extruding a low-density polyethylene forming a spring clip having an elongated portion and a hook portion and metallocene olefin forming a hollow ball onto said hook portion.

3. A spring clip for a rear discharge door of a lawnmower comprising: a spring clip formed of a low density polyethylene, said spring clip having an elongated portion and a hook portion and a flap formed of metallocene olefin attached to said elongated portion.

4. A spring clip for a rear discharge door of a lawnmower formed by co-extruding a low-density polyethylene forming a spring clip having an elongated portion and a hook portion and metallocene olefin forming a flap onto said elongated portion.

\* \* \* \* \*